(12) United States Patent
Berger et al.

(10) Patent No.: US 7,763,144 B2
(45) Date of Patent: Jul. 27, 2010

(54) DEVICE AND METHOD FOR THE DETACHMENT OF A TUBE BLANK FROM A SUPPORT CORE

(75) Inventors: Markus Berger, Sehnde (DE); Harald Kranz, Elze (DE); Klaus Binder, Sarstedt (DE); Rainer Oehl, Großburgwedel (DE)

(73) Assignee: Contitech Luftefedersystem GmbH, Hannover (DE)

( * ) Notice: Subject to any disclaimer, the term of this patent is extended or adjusted under 35 U.S.C. 154(b) by 1288 days.

(21) Appl. No.: 10/518,479

(22) PCT Filed: May 17, 2003

(86) PCT No.: PCT/DE03/01593
§ 371 (c)(1),
(2), (4) Date: Jun. 13, 2005

(87) PCT Pub. No.: WO2004/002709
PCT Pub. Date: Jan. 8, 2004

(65) Prior Publication Data
US 2005/0230044 A1     Oct. 20, 2005

(30) Foreign Application Priority Data
Jun. 28, 2002 (DE) .............................. 102 29 079

(51) Int. Cl.
*B32B 38/10* (2006.01)
(52) U.S. Cl. ...................... 156/344; 156/584; 264/335; 264/565; 264/573
(58) Field of Classification Search ................. 156/344, 156/584, 247; 264/335, 565, 573
See application file for complete search history.

(56) References Cited

U.S. PATENT DOCUMENTS

| 1,809,260 | A | 6/1931 | Wilson et al. |
| 2,361,026 | A | 10/1944 | Greene |
| 2,663,902 | A | 12/1953 | Anderson |
| 2,974,713 | A | 3/1961 | Hydrick, Jr. et al. |
| 6,022,445 | A | 2/2000 | Fofonoff et al. |

FOREIGN PATENT DOCUMENTS

| DE | 21 40 956 | 8/1978 |
| DE | 27 50 642 C2 | 6/1989 |
| FR | 2 653 056 | 4/1991 |
| GB | 449301 | 6/1936 |

*Primary Examiner*—Mark A Osele

(57) ABSTRACT

The invention relates to a method and a device for the removal of a tube blank (3) located on a support core (2). The tube blank (3) is detached from the support core (2) by means of the introduction of a medium through a device (10), whereby a detachment may be alternatively or additionally achieved by the application of a vacuum to a sleeve (4) enclosing the tube blank (3).

19 Claims, 4 Drawing Sheets

DEVICE AND METHOD FOR THE DETACHMENT OF A TUBE BLANK FROM A SUPPORT CORE

FIELD OF THE INVENTION

The invention relates to a method and an apparatus for the detachment of a tube blank from a support mandrel. The method and the apparatus are suitable in particular for the detachment of a tubular air-spring blank from a support mandrel.

BACKGROUND OF THE INVENTION

DE 27 50 6 42 C2 discloses a method and an apparatus for producing any desired blanks from elastomeric material. As disclosed, in order to remove a core, the product is put onto a carpet having a high coefficient of friction, and a longitudinal movement is superimposed on the carpet. The carpet is preferably made of rubber grooved in the transverse direction. This reference further describes how the core, before the product is applied, can be covered with a suitable separating agent, such as a silicone solution for example, and how compressed air is introduced into the product in order to achieve a certain enlargement of the product.

DE 21 40 9 56 C3 describes an apparatus for producing elbow hoses on mandrels. In this apparatus, an elbow blank is pushed onto the mandrel by means of a push cylinder. The push cylinder, which can be attached to the rear end face of the elbow blank in a pressure-tight manner, ensures that, when the elbow blank is pushed onto the mandrel, the air contained in the blank volume does not escape past the push cylinder but leads to an air cushion between the elbow blank and the mandrel. This air cushion facilitates the push-on operation.

SUMMARY OF THE INVENTION

The invention provides an apparatus and a method with which tubular blanks of finite length can be easily separated from the support mandrel, so that further processing of the blank can be quickly accomplished, and reuse of the support mandrel is ensured.

According to embodiments of the invention, by the insertion of a device for introducing a medium at one end of the support mandrel between the extruded blank and the support mandrel and by the injection or introduction of a medium by means of the device, an air cushion or film is achieved. As a result, the blank, which typically sticks to the support mandrel, is detached and a separating gap is produced. On this account, easy removal of the support mandrel is possible.

In order to ensure even and complete detachment of the blank, the end of the blank which is opposite the device is sealed off, or a second device is inserted between the blank and support mandrel, so that the blank does not stick at a point or over a certain section of the circumference of the support mandrel. If the blank is sealed off at one end, for example, by fitting a clip or a closure ring, the blank is completely detached up to the sealing point.

For easier detachment of the blank from the support mandrel, provision may be made for liquid or powdery separating agents that assist or make possible easy separation to be added to the medium. The separating agents can be applied to the support mandrel before the fabrication of the tube blank. The support mandrel may be provided with the non-stick coating.

After the detachment of the blank from the support mandrel, provision may be made for the latter to be pushed out by the medium, for example, if the support mandrel is partly formed as a hollow body and the medium accumulates in this hollow body, or for the support mandrel to be pulled out of the inflated and widened blank by an extraction device. The support mandrel is advantageously pulled out in an automatic or semiautomatic manner.

In one aspect, in order to prevent uncontrolled widening or partial widening of the blank, provision is made in an advantageous development for the blank located on the support mandrel to be inserted into a sleeve before the injection of the gaseous medium. This sleeve limits the expansion of the blank, where the inside diameter of the sleeve is at least slightly larger than the outside diameter of the blank.

In order to be able to introduce the medium at any desired location or also centrally inside the device, the device is fastened to the sleeve in such a way that the blank is clamped in place between the sleeve and the device, preferably in a sealing manner. In this way, it is possible to achieve complete detachment and separation of the blank from the support mandrel with only one feeding point for the medium.

To assist in the detachment of the blank from the support mandrel, provision is made for a vacuum to be generated in the sleeve, in which case, as an alternative to the method of introducing a medium, such as, for example, air, water or oil, provision is made for the blank on the support mandrel to be sealed off from the sleeve and for a vacuum to be generated in the sleeve. In this way, the blank is separated from the support mandrel solely on account of the vacuum. To this end, it may be necessary for a mechanism which provides the inflow of the ambient air to be incorporated in the bearing surface of the support mandrel.

An apparatus according to the invention provides for a device for introducing a medium at one end of the support mandrel to be arranged between the blank and the support mandrel, and for there to be feeding elements for introducing the medium between the blank and the support mandrel. A gap or a film is produced in a specific manner between the support mandrel and tube blank by the apparatus. As a result, the support mandrel and tube blank can easily be released from one another.

An advantageous configuration of the invention provides for a sleeve to be arranged around the blank. This sleeve is closed at least at one of its ends by the device, and the blank advantageously is sealed off from the support mandrel at the other end. This configuration may lead to limitation of the radial expansion of the blank and, to complete detachment of the blank from the support mandrel. In addition, on account of controlled widening and by avoiding excessive expansion, the material is protected and quality improvement is achieved at the tube blank.

To ensure that the sleeve is reliably sealed off from the environment or from the device, provision is made for the device to be capable of being fastened to the sleeve, preferably via clamping cylinders, so that the device moves onto the support mandrel and in the process clamps the tube blank in place between it and the sleeve in a sealing manner.

In an alternative configuration of the apparatus, provision is made for a sleeve arranged around the blank to be provided with sealing elements for forming an essentially airtight space together with the blank. Also, a device may be provided for generating a vacuum in the space formed by the sleeve and the blank, so that the blank is separated from the support mandrel on account of the vacuum. Advantageously provided in the support mandrel for this purpose are air-inlet arrangements which allow the ambient air to flow into a gap forming between the support mandrel and the tube blank.

To facilitate the manipulation of the bulky and heavy support mandrel, provision is made for the sleeve to be designed to be split or hinged in its longitudinal extent; so that the support mandrel together with the blank can be inserted into the swung-open sleeve and the latter can then be closed. It is, of course, also possible to design the sleeve in one piece, in which case the support mandrel must then be pushed into this sleeve.

In order to avoid sticking of the tube blank, preferably of an unvulcanized tube blank, to the inside of the sleeve, the latter is advantageously provided with a repellent coating, for example, Polytetrafluoroethylene (PTFE) coating.

In order to achieve certain preforming by appropriate widening during the introduction of the medium, a conical design of the sleeve may be provided. This leads to different radii in the course of the longitudinal extent of the tube blank on account of different widening until the tube blank bears against the inside of the sleeve. Such a conical design of the tube blank is advantageous in particular for the production of air springs. In deviation from a conical design, the sleeve may have various geometries, such as, for example, multiple conicity or a corrugated shape, in order to permit corresponding adaptation of the blank to various intended uses. By inflation which varies in this way, adapted products from the preliminary materials shaped cylindrically beforehand can be vulcanized in a subsequent processing step.

BRIEF DESCRIPTION OF THE DRAWINGS

The foregoing and other aspects and advantages will be better understood from the following detailed description of embodiments of the invention with reference to the drawings, in which.

DETAILED DESCRIPTION OF EMBODIMENTS OF THE INVENTION

Figure 1:
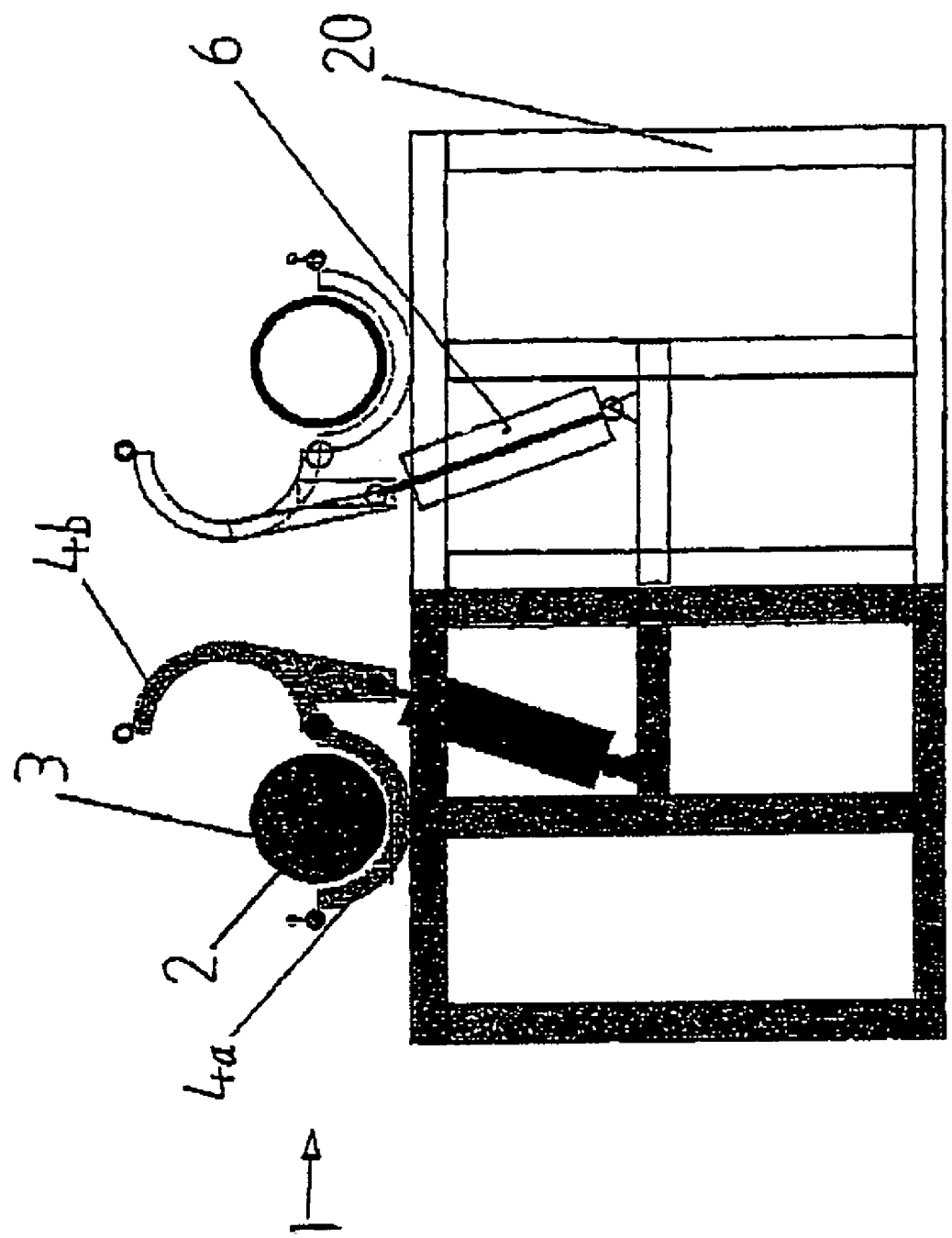
FIG. 1 shows a side view of the apparatus.

Shown in FIG. 1 is a side view of an apparatus 1 in which a support mandrel 2 with an extruded tube blank 3 is inserted into a swung-open two-piece sleeve 4, which includes a bottom part 4a and a top part 4b. In this aspect of the invention, two apparatuses 1 are mounted back to back on the frame 20, with the sleeve 4 is mounted on a frame 20. In one aspect of the invention, the sleeve 4 may be provided to prevent uncontrolled widening or partial widening of the blank. That is, the sleeve may limit the expansion of the blank, where the inside diameter of the sleeve is at least slightly larger than the outside diameter of the blank. This added space allows a gap or a film to be produced in between the support mandrel 2 and tube blank for easy removal of the blank.

The top part 4b of the sleeve 4, relative to the sleeve bottom part 4a, is swung from the open position shown into a closed position via a lifting cylinder 6. The sleeve 4 can be locked in the closed state and has an inside diameter which is greater than the outside diameter of the tube blank 3. The hinged sleeve facilitates the manipulation of the support mandrel so that the support mandrel together with the blank can be inserted into the swung-open sleeve 4 and the latter can then be closed. It is, of course, also possible to design the sleeve in one piece, in which case the support mandrel 2 will be pushed into this sleeve.

In one implementation, the tube blank 3 comprises at least one rubber or plastic layer which has been applied to the support mandrel 2; however, the rubber mixture is preferably encased with strength members on the support mandrel 2 in order thus to obtain a thin-walled and robust tube blank 3. These strength members are, for example, fibers, threads, wires or wovens or nonwovens. At the end of an extruder line, in which such a tube blank 3 is applied to the support mandrel 2, the support mandrel 2 is received at the end faces and are put into the sleeve 4 in order to be separated from one another before the vulcanization.

Figure 2:
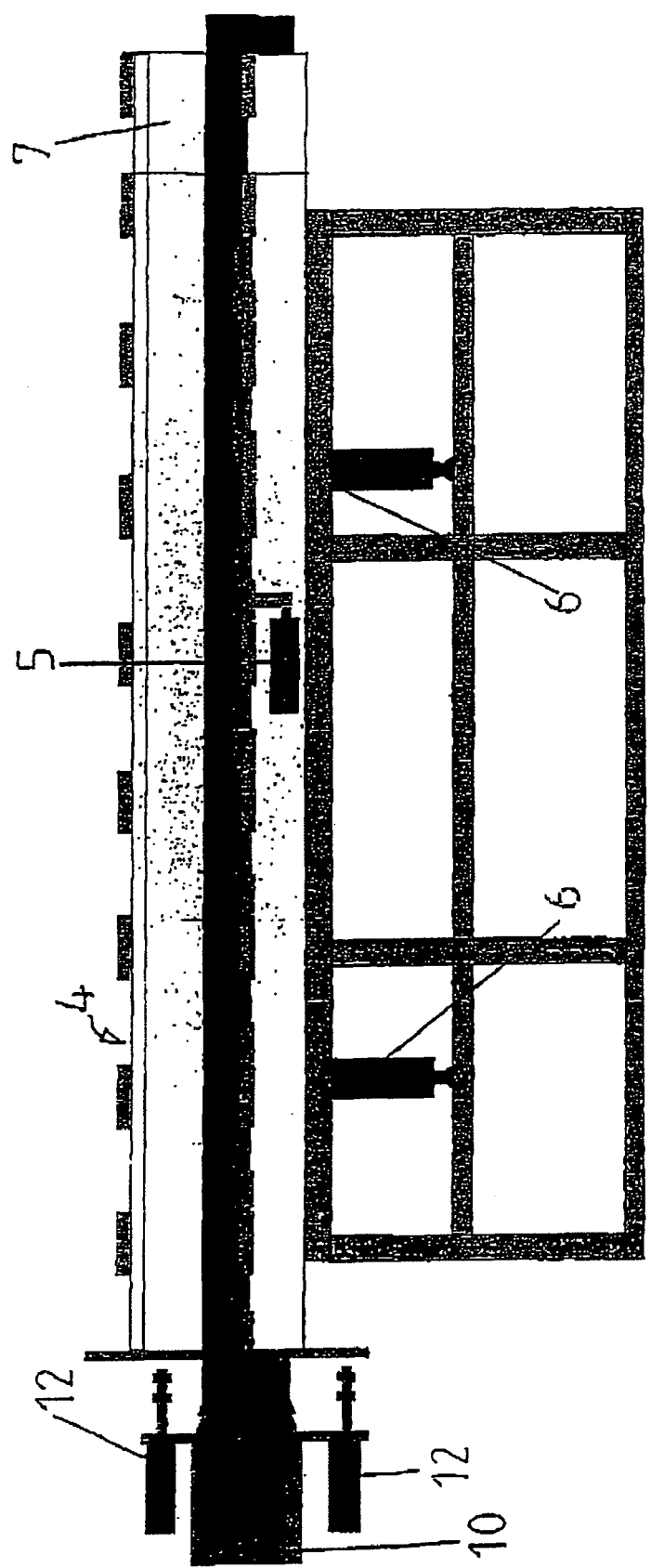
FIG. 2 shows a front view of the apparatus with swung-open sleeve.

The apparatus 1 according to FIG. 1 is shown turned through 90° in FIG. 2. In this view, it is shown that the support mandrel 2 with the tube blank 3 is longer than the sleeve 4. An attachment piece 7 projects from one side of the mandrel 2 and is designed as an extension element arranged on the sleeve, in the exemplary embodiment in FIG. 2, in order to permit easy adaptability to various production requirements. The support mandrel 2 projects from the sleeve 4 at the end faces on both sides, and the sleeve 4, after the insertion of the blank 3 together with the support mandrel 2, is locked via a locking cylinder 5. Both the lifting cylinders 6 and the locking cylinder 5 preferably work hydraulically or pneumatically, although other working principles are possible and are envisaged.

Arranged on the left-hand end of the blank 3 is a device 10 for introducing a medium, which is pushed in between the support mandrel 2 and the blank 3 with its frustoconical end. In one aspect of the invention, the blank 3 can be manually released from the support mandrel 2 beforehand and widened in order to make it easier to push in the frustum of the device 10. In this case, the device 10 is designed in such a way that the end of the device 10, opposite the frustoconical end, is closed. Also arranged on the device 10 are clamping cylinders 12, with which the device 10 can be clamped relative to the sleeve 4.

Figure 3:
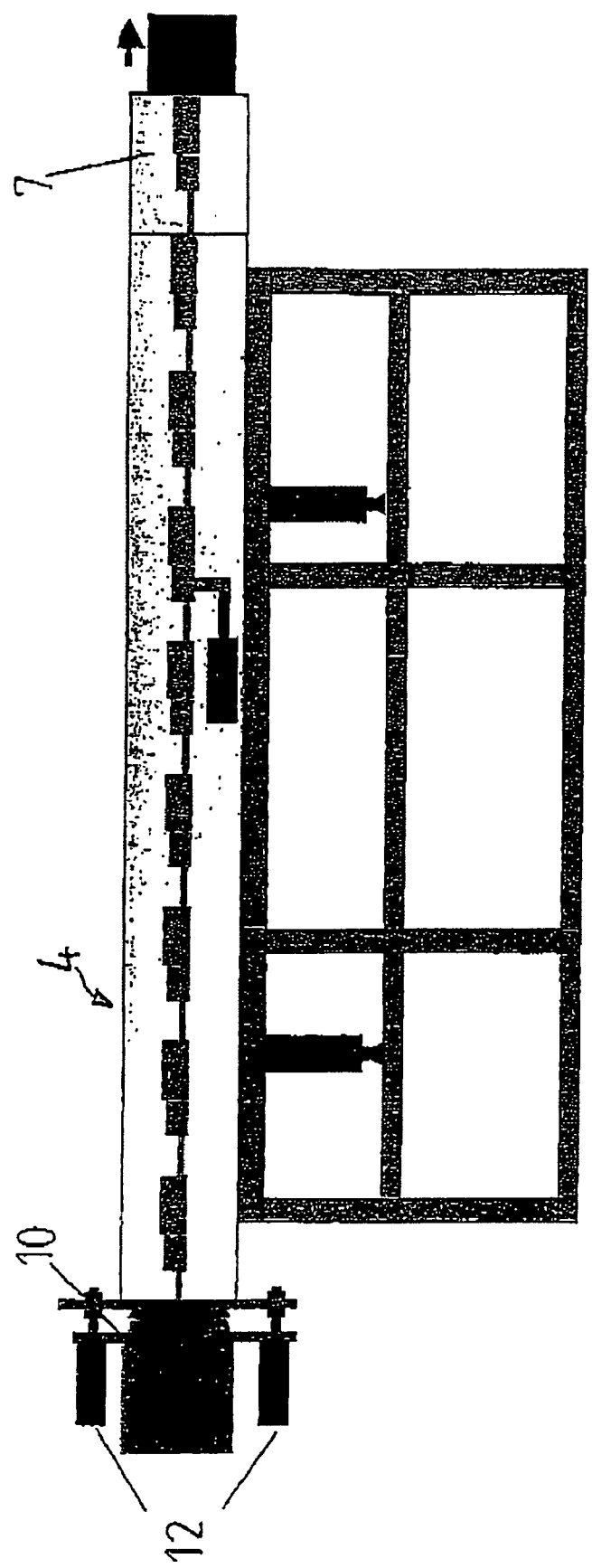
FIG. 3 shows a front view of the apparatus with swung-shut sleeve and fastened feeding device.

A clamped state of the device 10 relative to the sleeve 4 is shown in FIG. 3, in which the clamping cylinders 12 engage in a collar-like widening of the sleeve 4 and pull the frustoconical portion of the device 10 toward the sleeve 4. In the process, overall, the support mandrel 2 is shifted to the right, as indicated by the arrow at the right-hand end.

Figure 4:
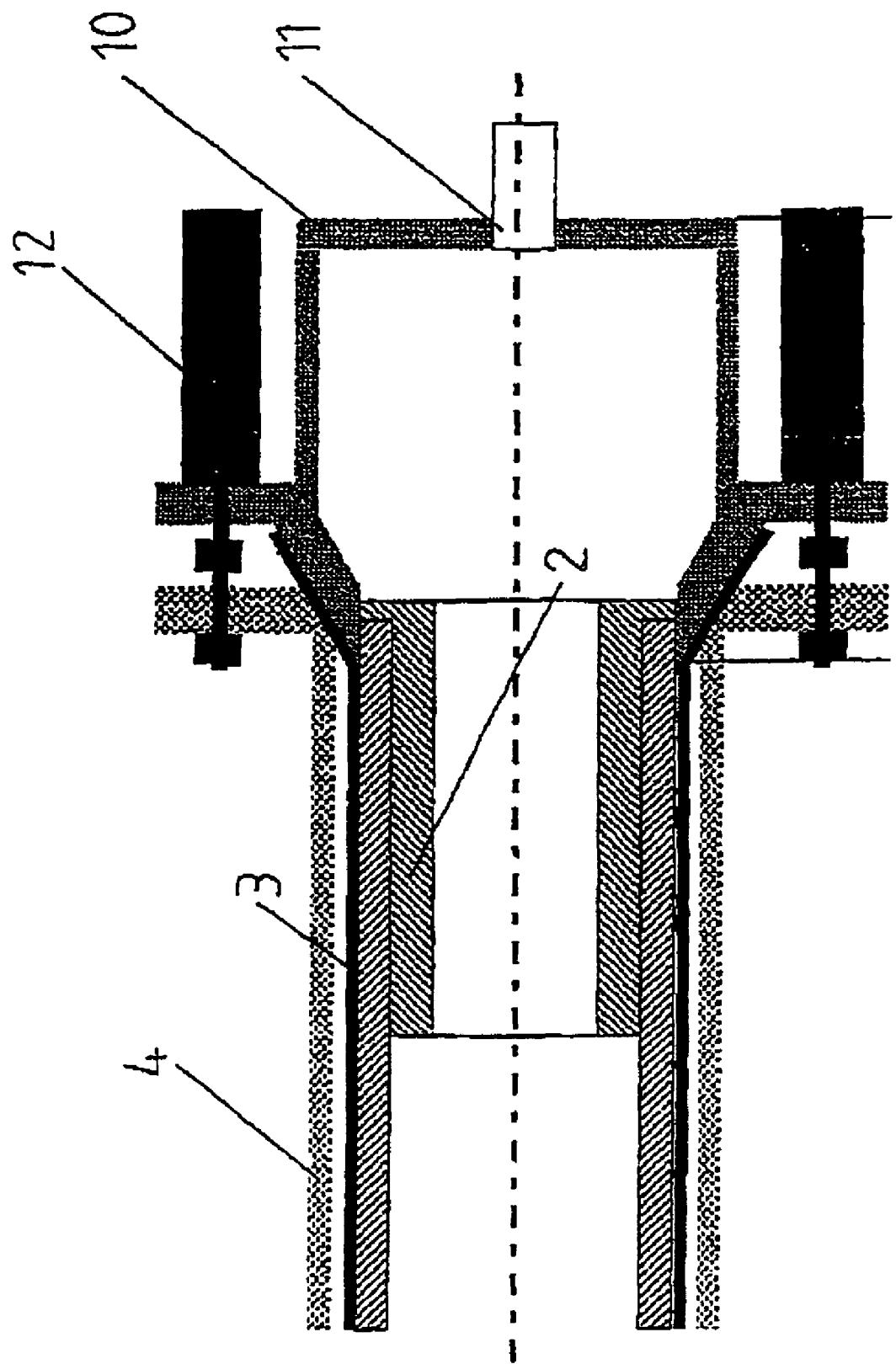
FIG. 4 shows a detailed view of the apparatus according to FIG. 3.

The arrangement illustrated in FIG. 3 is shown in the form of a sectional representation in FIG. 4. In this representational view, the clamping of the device 10 relative to the sleeve 4 is provided via the clamping cylinders 12. Also, the clamping of the tube blank 3 is shown between the frustoconical end of the device 10 and the sleeve 4. By having the device 10 fastened to the sleeve 4 in such a way that the blank 3 is clamped in place between the sleeve 4 and the device 10, introduction of the medium at any desired location or also centrally inside the device is possible. In this way, it is possible to achieve complete detachment and separation of the blank 3 from the support mandrel 2 with only one feeding point for the medium.

In order to ensure even and complete detachment of the blank, the end of the blank which is opposite the device 10 is sealed off, or a second device is inserted between the blank 3 and support mandrel 2, so that the blank does not stick at a point or over a certain section of the circumference of the support mandrel 2. If the blank is sealed off at one end, for example, by fitting a clip or a closure ring (as is illustratively shown in FIG. 2 at reference "C"), the blank is completely detached up to the sealing point. Furthermore, a feeding element 11 is arranged on the side of the device 10 which is remote from the frustoconical end. Compressed air or another suitable medium such as water or oil can be introduced into the device 10 via the feeding element 11.

As can be seen from the figures, the support mandrel 2 is not completely hollow but rather has only one end-face bore for accommodating manipulating elements, so that, if a positive pressure is introduced via the feeding element 11, the medium can penetrate only between the blank 3 and the support mandrel 2 and thus detaches the blank 3. Bores, grooves or other passages can be provided in the frustoconical end for simple introduction of the medium. In such a scenario, these bores, grooves or other passages are advantageously to emerge as close to the outside diameter of the support mandrel 2 as possible.

After the positive pressure has been introduced, the blank 3 will be widened until part of the outer surface touches the inside diameter of the sleeve 4. The medium is introduced until the blank 3 has been completely or substantially completely released from the support mandrel 2 over the entire length and the medium comes out at the other end, or the support mandrel 2 is pushed out by the slight positive pressure. After detachment of the blank 3, the support mandrel 2 can be pulled out at the opposite end of the device 10. After complete removal of the mandrel, the device 10 is released from the sleeve 4, which is swung open, and the blank 3 can be removed.

In order to avoid sticking of the blank 3 to the inside of the sleeve 4, the latter may be provided with a non-stick coating, for example, wetted or smeared with PTFE and/or with a separating agent which prevents sticking. In addition, liquid or powdery substances can be introduced with the medium in order to facilitate detachment. Likewise, provision may be made for the end of the blank 3, which is remote from the device 10, to be sealed off in order to build up a pressure between the support mandrel 2 and the blank 3. By a configuration of the sleeve 4, various outside diameters of the tube blank can be pre-expanded in order to facilitate further processing of the tube blank 3.

In addition to, or as an alternative to, the detachment and the removal of the tube blank 3 from the mandrel via compressed air, provision is made for this to be assisted or replaced via a vacuum process. In this aspect, the intermediate space between sleeve 4 and tube blank 3 is sealed off and a vacuum is generated. Depending on requirements, different tube blank lengths can be processed via the extension elements 7.

While the invention has been described in terms of embodiments, those skilled in the art will recognize that the invention can be practiced with modification within the spirit and scope of the appended claims.

The invention claimed is:

1. A method for the detachment of a tube blank from a support mandrel, comprising:
   inserting a device at one end of the support mandrel;
   inserting the blank on the support mandrel into a sleeve for limiting radial expansion of the blank,
   attaching expansion pieces to the sleeve to accommodate the length of the blank, and
   introducing a medium between the blank and the support mandrel.

2. The method as claimed in claim 1, wherein an end of the blank which is opposite the device is sealed off from the support mandrel.

3. The method as claimed in claim 1, further comprising providing a closure element on the blank in order to ensure complete detachment of the blank from the support mandrel.

4. The method as claimed in claim 1, wherein the blank is detached from the support mandrel by expanding the blank away from the surface of the support mandrel.

5. The method as claimed in claim 1, further comprising introducing liquid or powdery separating agents with the medium.

6. The method as claimed 1, further comprising, after detachment of the blank from the support mandrel, pushing out the blank from the support mandrel by the medium or the support mandrel is moved out.

7. The method as claimed in claim 1, further comprising fastening the device to the sleeve in such a way that the blank is clamped in place between the sleeve and the device.

8. The method as claimed in claim 1, further comprising generating a vacuum in the sleeve.

9. The method as claimed in claim 1, wherein the medium penetrates only between the blank and the support mandrel and thus detaches the blank from the support mandrel.

10. The method as claimed in claim 1, further comprising providing a non-stick surface provided on an interior surface of the sleeve.

11. An apparatus for the detachment of a tube blank from a support mandrel, comprising:
    a device for introducing a medium at one end of the support mandrel, the device being arranged between the blank and the support mandrel; and
    a feeding element provided at the device and for introducing the medium between the blank and the support mandrel,
    the apparatus further comprising a sleeve which is arranged around the blank and which has a variable in length via attachment pieces.

12. The apparatus as claimed in claim 11, wherein the sleeve is closed at least at one end by the device, the blank being sealed off from the support mandrel at the other end.

13. The apparatus as claimed in claim 12, wherein the sleeve includes a first part hinged to a second part along a longitudinal extent.

14. The apparatus as claimed in claim 13, further comprising a closing mechanism for closing the first part or the second part of the sleeve when the blank and support mandrel are inserted therein.

15. The apparatus as claimed in claim 12, wherein the device is fastened to the sleeve.

16. The apparatus as claimed in claim 12, wherein an inner diameter of the sleeve is larger than an outer diameter of the blank thus providing provision for expansion of the blank.

17. The apparatus as claimed in claim 12, wherein the sleeve is cylindrical or contoured.

18. The apparatus as claimed in claim 11, further comprising a closure device at an end of the blank, remote from the device.

19. A method for the detachment of a tube blank from a support mandrel, comprising the steps of
    inserting a device at one end of the support mandrel; and
    generating pressure by introducing a medium between the blank and the support mandrel by the device until the blank is separated from the mandrel, and
    introducing additional medium until the generated pressure moves the mandrel outward.

* * * * *